(12) United States Patent
Sung (10) Patent No.: US 10,367,587 B2
(45) Date of Patent: Jul. 30, 2019

(54) FREQUENCY ALLOCATION METHOD AND TRANSMISSION APPARATUS FOR PERFORMING THE METHOD

(71) Applicant: Electronics and Telecommunications Research Institute, Daejeon (KR)

(72) Inventor: Minkyu Sung, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/792,342

(22) Filed: Oct. 24, 2017

(65) Prior Publication Data

US 2018/0152248 A1    May 31, 2018

(30) Foreign Application Priority Data

Nov. 29, 2016 (KR) .................. 10-2016-0160853

(51) Int. Cl.
*H04B 10/27* (2013.01)
*H04B 10/58* (2013.01)
*H04B 10/2575* (2013.01)

(52) U.S. Cl.
CPC ....... *H04B 10/58* (2013.01); *H04B 10/25753* (2013.01); *H04B 10/27* (2013.01)

(58) Field of Classification Search
CPC ......... H04B 10/58; H04B 10/27; H04B 10/25
USPC ........................................ 398/186, 183, 115
See application file for complete search history.

(56) References Cited

U.S. PATENT DOCUMENTS

| | | | | |
|---|---|---|---|---|
| 5,060,310 A | * | 10/1991 | Frisch | H04B 1/62 398/193 |
| 5,305,134 A | * | 4/1994 | Tsushima | H04B 10/50 398/203 |
| 5,315,583 A | * | 5/1994 | Murphy | H04H 20/31 370/312 |
| 5,596,436 A | * | 1/1997 | Sargis | H04J 14/2098 398/76 |
| 6,058,227 A | * | 5/2000 | Wong | H04J 14/0298 385/16 |
| 6,078,412 A | * | 6/2000 | Fuse | H04J 14/2098 398/1 |
| 6,489,847 B1 | | 12/2002 | van Zeijl | |
| 6,539,216 B1 | | 3/2003 | Oh et al. | |
| 7,076,168 B1 | * | 7/2006 | Shattil | H04B 10/25752 398/202 |
| 7,206,520 B2 | * | 4/2007 | Way | H04B 10/50 398/183 |
| 7,209,526 B2 | | 4/2007 | Kim et al. | |
| 8,260,143 B2 | * | 9/2012 | Gupta | H04L 27/2096 398/115 |

(Continued)

FOREIGN PATENT DOCUMENTS

KR    2002-0049072 A    6/2002
KR    10-2005-0077855 A    8/2005

*Primary Examiner* — Oommen Jacob
(74) *Attorney, Agent, or Firm* — NSIP Law (57) ABSTRACT

Provided is a frequency allocation method and a transmission apparatus for performing the method, the frequency allocation method may allocate a center frequency of a first intermediate frequency (IF) carrier of combined IF carriers at a position which is a predetermined interval apart based on direct current (DC) to avoid in view of a non-linear signal distortion component that is generated by an interaction between a chirp and a chromatic dispersion of a laser in a mobile fronthaul.

8 Claims, 5 Drawing Sheets

(56) References Cited

U.S. PATENT DOCUMENTS

| | | | |
|---|---|---|---|
| 9,184,960 B1 | 11/2015 | Harel | |
| 2001/0005401 A1* | 6/2001 | Ishida | H04L 5/06 375/295 |
| 2002/0039211 A1* | 4/2002 | Shen | B82Y 15/00 398/9 |
| 2002/0051461 A1* | 5/2002 | Calderone | H03D 7/161 370/430 |
| 2004/0110534 A1* | 6/2004 | Chung | H04W 88/085 455/561 |
| 2015/0381217 A1* | 12/2015 | Kim | H03F 1/3247 375/297 |
| 2016/0204869 A1* | 7/2016 | Nishihara | H04B 10/516 398/43 |
| 2016/0241278 A1* | 8/2016 | Lee | H04B 1/0475 |
| 2017/0093495 A1* | 3/2017 | Lozhkin | H04B 10/25753 |
| 2017/0126320 A1* | 5/2017 | Cho | H04B 10/25754 |
| 2017/0180053 A1* | 6/2017 | Lozhkin | H04B 10/564 |
| 2018/0076989 A1* | 3/2018 | Lozhkin | H04L 25/4902 |
| 2018/0152245 A1* | 5/2018 | Sung | H04B 10/25758 |
| 2018/0152248 A1* | 5/2018 | Sung | H04B 10/58 |

\* cited by examiner

FREQUENCY ALLOCATION METHOD AND TRANSMISSION APPARATUS FOR PERFORMING THE METHOD

CROSS-REFERENCE TO RELATED APPLICATION(S)

This application claims the priority benefit of Korean Patent Application No. 10-2016-0160853 filed on Nov. 29, 2016, in the Korean Intellectual Property Office, the disclosure of which is incorporated herein by reference for all purposes.

BACKGROUND

1. Field

One or more example embodiments relate to a frequency allocation method and a transmission apparatus for performing the method, and more particularly, to a method of assigning an intermediate frequency (IF) carrier to avoid a performance degradation in view of a non-linear signal distortion component that is generated by an interaction between a chirp and a chromatic dispersion of a laser in a mobile fronthaul using an IF-over-fiber (IFoF) based analog transmission scheme.

2. Description of Related Art

Recently, with the intense competition of speed and service quality between international long term evolution (LTE) providers, mobile traffic is radically increased by an existing Internet service, over-the-top (OTT) video services such as YouTube and Mobile IPTV. To minimize the increase in mobile traffic, each international LTE provider is competitively increasing base station sites such as macrocells and small cells in a service coverage.

However, when the base station site is continuously enlarged, a capital expense (CAPEX) and an operating expense (OPEX) to establish and manage a nationwide network may increase. As the mobile communication technology is developed to third generation (3G), fourth generation (4G), and fifth generation (5G), a cell size in the service coverage may gradually decrease. Thus, a greater number of cell sites need to be established and managed.

To solve such issues, a cloud/centralized radio access network (C-RAN) technology was developed as a next generation radio access network (RAN) structure. Here, the C-RAN technology is broadly divided into a cloud-RAN system and a centralized RAN system. The C-RAN technology separates a digital unit (DU) and a radio unit (RU) conventionally at a single cell site, gathers and manages UDS at each cell site, and disposes an RU at a cell site in which radio signals are transmitted and received in reality. The DU and the RU at different sites are connected to each other through an optical cable.

Here, a section in which signals are transmitted between the DU and the RU through the optical cable is referred to as a mobile fronthaul section in C-RAN. As a method to transmit optical signals between the DU and the RU in the section, an intermediate frequency-over-fiber (IFoF) based analog optical transmission scheme which is simply structured and cost-efficient is suggested as a technology to implement a mobile fronthaul of C-RAN.

An optical signal passes through the mobile fronthaul in a form of a laser. In the corresponding process, the IFoF based analog optical transmission scheme may cause a chirp phenomenon of the layer, and the chirp phenomenon may cause a non-linear signal distortion component in a system. Thus, a performance degradation may occur.

Accordingly, a method to transmit an optical signal while avoiding a performance degradation that may occur in a mobile fronthaul in an IFoF based analog optical transmission scheme is needed.

SUMMARY

An aspect provides a method to avoid a performance degradation by an interaction between a chirp and a chromatic dispersion appearing in an intermediate frequency-over-fiber (IFoF) based analog optical transmission mobile fronthaul.

According to an aspect, there is provided a frequency allocation method performed by a transmission apparatus, the frequency allocation method including modulating a data signal to be transmitted to a reception apparatus into single- or multi-channel baseband modulation signals, generating respective intermediate frequency (IF) carriers corresponding to the modulation signals, combining the IF carriers based on a bandwidth of each of the IF carriers and a center frequency space between the IF carriers, and allocating a center frequency of a first IF carrier of the combined IF carriers at a position which is a predetermined interval apart based on direct current (DC).

The allocating may include allocating the center frequency of the first IF carrier at a position which is a predetermined interval corresponding to a total bandwidth of the combined IF carriers apart.

The total bandwidth of the combined IF carriers may be determined based on the bandwidth of each of the combined IF carriers, the center frequency space between the IF carriers, and a number of the IF carriers.

The center frequency of the first IF carrier may be determined based on a total bandwidth of the combined IF carriers and a half of a bandwidth of the first IF carrier.

The allocating may include allocating a center frequency of a last IF carrier of the combined IF carriers such that the center frequency of the last IF carrier may satisfy the center frequency of the first IF carrier and a half of a bandwidth of the last IF carrier based on a total bandwidth of the combined IF carriers.

The combined IF carriers may be converted from electrical signals to optical signals at the position which is the predetermined interval apart and sequentially transmitted to the reception apparatus, and in response to completion of the transmission of the combined IF carriers including a last IF carrier to the reception apparatus, a distortion signal corresponding to twice a total bandwidth of the combined IF carriers may be generated with respect to the combined IF carriers.

According to another aspect, there is provided a transmission apparatus including a signal modulator configured to modulate a data signal to be transmitted to a reception apparatus into single- or multi-channel baseband modulation signals, a signal converter configured to convert combinations of the modulation signals and corresponding carrier signals into IF carriers, a signal combiner configured to combine the IF carriers, and a signal transmitter configured to allocate a center frequency of a first IF carrier of the combined IF carriers at a position which is a predetermined interval apart based on DC and transmit the combined IF carriers using optical signals.

The signal transmitter may be configured to allocate the center frequency of the first IF carrier at a position which is a predetermined interval corresponding to a total bandwidth of the combined IF carriers apart.

The total bandwidth of the combined IF carriers may be determined based on a bandwidth of each of the combined IF carriers, a center frequency space between the IF carriers, and a number of the IF carriers.

The center frequency of the first IF carrier may be determined based on a total bandwidth of the combined IF carriers and a half of a bandwidth of the first IF carrier.

The signal transmitter may be configured to allocate a center frequency of a last IF carrier of the combined IF carriers such that the center frequency of the last IF carrier satisfies the center frequency of the first IF carrier and a half of a bandwidth of the last IF carrier based on a total bandwidth of the combined IF carriers.

The signal transmitter may be configured to convert the combined IF carriers from electrical signals to optical signals at the position which is the predetermined interval apart and sequentially transmit the combined IF carriers to the reception apparatus, and in response to completion of the transmission of the combined IF carriers including a last IF carrier to the reception apparatus, a distortion signal corresponding to twice a total bandwidth of the combined IF carriers may be generated with respect to the combined IF carriers.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
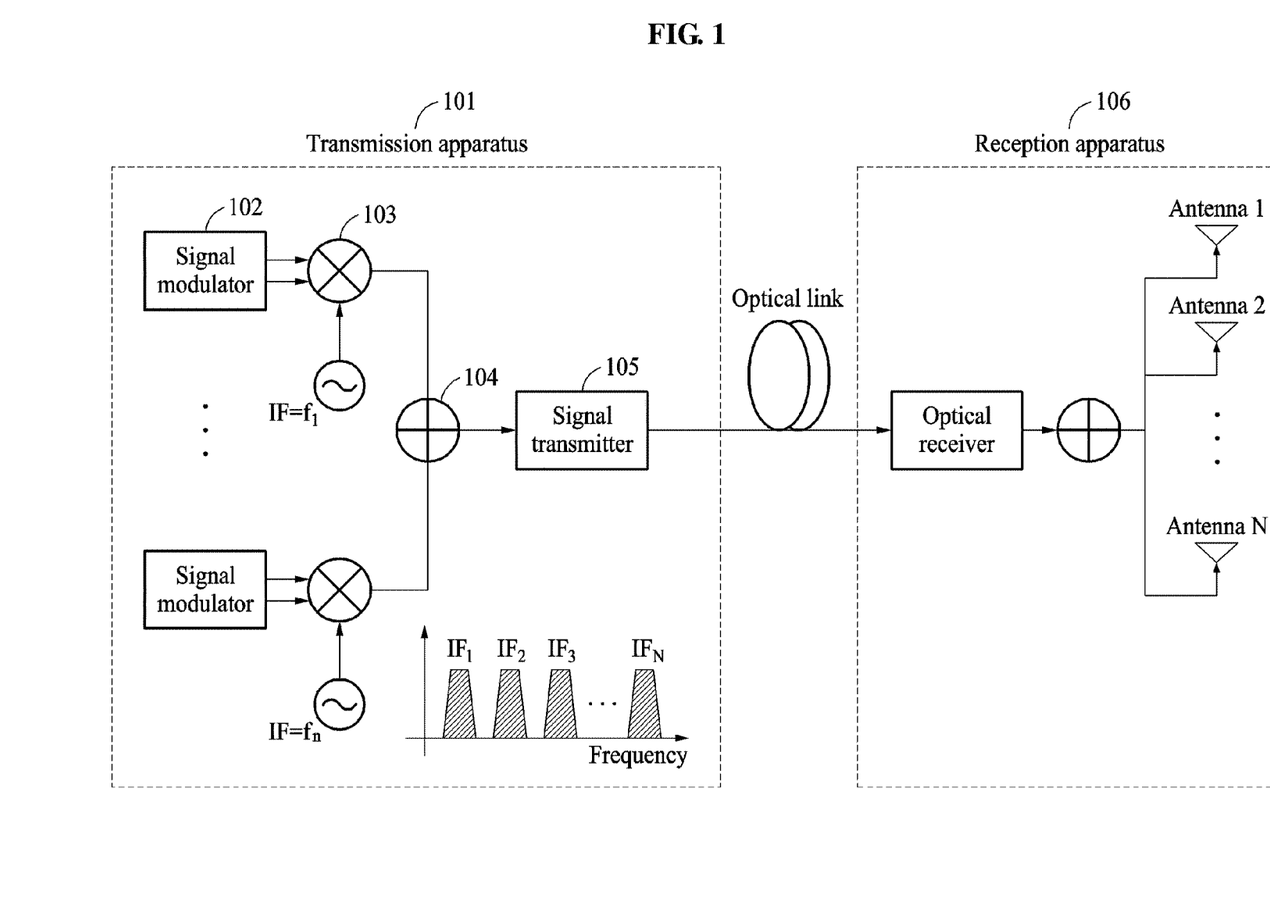
FIG. 1 illustrates an overall configuration of a transmission apparatus that transmits an optical signal through a mobile fronthaul section and a reception apparatus according to an example embodiment.

FIG. 1 illustrates an overall configuration of a transmission apparatus that transmits an optical signal through a mobile fronthaul section and a reception apparatus according to an example embodiment.

Referring to FIG. 1, a mobile communication network may include a transmission apparatus 101 and a reception apparatus 106.

The transmission apparatus 101 and the reception apparatus 106 may be implemented using a cloud/centralized radio access network (C-RAN) which is a next generation radio access network. The transmission apparatus 101 and the reception apparatus conventionally at a single cell site may be separated from each other. In an example, the transmission apparatus 101 may correspond to a digital unit (DU) of the mobile communication network, and the reception apparatus 106 may correspond to a radio unit (RU) of the mobile communication network.

The transmission apparatus 101 may process a single- or multi-channel baseband signal, and the reception apparatus 106 may generate a mobile signal by modulating the processed baseband signal into a radio frequency (RF) signal. The reception apparatus 106 may output the generated mobile signal to a user equipment (UE) using each antenna.

In this example, the transmission apparatus 101 implemented using the C-RAN may convert the single- or multi-channel baseband signal into an optical signal and transmit the optical signal to the reception apparatus 106. An optical link may be provided between the transmission apparatus 101 and the reception apparatus 106 to transmit the optical signal. A section in which the optical signal is transmitted through the optical link may be designated as a mobile fronthaul section. The mobile fronthaul section may be implemented using an intermediate frequency-over-fiber (IFoF) based analog optical transmission scheme which is simply structured and cost-efficient, whereby the transmission apparatus 101 may transmit the optical signal to the reception apparatus 106.

Here, the transmission apparatus 101 may transmit the optical signal in view of a secondary non-linear signal distortion component to be generated during a process of transmitting the optical signal to the reception apparatus 106. That is, the transmission apparatus 101 may allocate a frequency of (*to the optical signal in view of the secondary distortion component to be generated by a chirp and a chromatic dispersion of a laser in the optical link.

In detail, to transmit the optical signal to the reception apparatus 106, the transmission apparatus 101 may include a signal modulator 102, a signal converter 103, a signal combiner 104, and a signal transmitter 105.

The signal modulator 102 may modulate a data signal to be transmitted to the reception apparatus into single- or multi-channel baseband modulation signals. That is, the signal modulator 102 may express the data signal in a form suitable for short distance transmission or a form suitable for being loaded on a carrier using a digital signal. In an example, the signal modulator 102 may be implemented using baseband modulation that modulates the data signal to be transmitted to the reception apparatus. Further, the signal modulator 102 may generate at least one digital baseband modulation signal, corresponding to a single channel or multiple channels, for mobile communication.

The signal converter 103 may convert combinations of the modulation signals and corresponding carrier signals into IF carriers. That is, the signal converter 103 may incorporate the modulation signals in the IF carriers by loading the modulation signals on the IF carriers of predetermined frequencies. Here, a number of signal converters 103 may be equal to a number of signal modulators 102 that generate modulation signals. The signal converters 103 may combine different carrier signals with the modulation signals.

In an example, in a case in which n signal converters are provided, the signal converters may use different carrier signals, in detail, a first signal converter may use a first carrier signal $f_1$, a second signal converter may use a second carrier signal $f_2$, and an n-th signal converter may use an n-th carrier signal $f_n$. The signal converters may convert combinations of the carrier signals and the modulation signals into the IF carriers, respectively.

The signal combiner 104 may combine the IF carriers. That is, the signal combiner 104 may combine the plurality of IF carriers, and the combined IF carriers may be transmitted simultaneously with respect to the multiple modulation signals through a single optical link through frequency-multiplexing.

The signal transmitter 105 may convert the frequency-multiplexed IF carriers from electrical signals to optical signals, and transmit the optical signals to the reception apparatus 106 through the optical link. The reception apparatus 106 may receive the optical signals through the optical link, and convert the received optical signals into electrical signals. Frequencies of the electrical signals may be modulated to a corresponding RF band, and the frequency-modulated electrical signals may be output or transmitted to a mobile device through respective antennas.

Here, the signal transmitter 105 configured to transmit the optical signal may be implemented using a device requiring a low installing cost to convert the electrical signals to the optical signals. In general, such a device may convert signals using a direct strength modulation scheme.

In this example, as described above, a chirp phenomenon of the laser may occur during a process of converting signals. The chirp phenomenon of the laser is a phenomenon in which an oscillation frequency changes based on input current. The chirp phenomenon of the laser may have little influence on a wavelength in which a chromatic dispersion of an optical fiber is absent. However, in a case in which the optical link uses a wavelength band in which a chromatic dispersion exists, the chirp of the laser may interact with the chromatic dispersion and cause a phase shift. Further, the optical link phase-shifted by the interaction with the chromatic dispersion may be converted to a strength signal through a square-law detection process of the reception apparatus. The strength signal may be a non-linear signal distortion component like noise, and thus may reduce a signal-to-noise ratio (SNR) of a system.

Thus, as a method to avoid a performance degradation by the interaction between the chirp and the chromatic dispersion of the laser that appears in the IFoF based analog optical transmission mobile fronthaul, the following method may be suggested.

The signal transmitter 105 may transmit the combined IF carriers using the optical signals by allocating a center frequency of a first IF carrier of the combined IF carriers at a position which is a predetermined interval apart based on direct current (DC). That is, the signal transmitter 105 may allocate the center frequency of the first IF carrier at a position which is a predetermined interval corresponding to a total bandwidth of the combined IF carriers apart, thereby avoiding a distortion signal to be generated at a center frequency of an IF carrier, that is, a secondary non-linear signal distortion component. A configuration therefor will be described in detail with reference to FIGS. 2 through 4.

Figure 2:
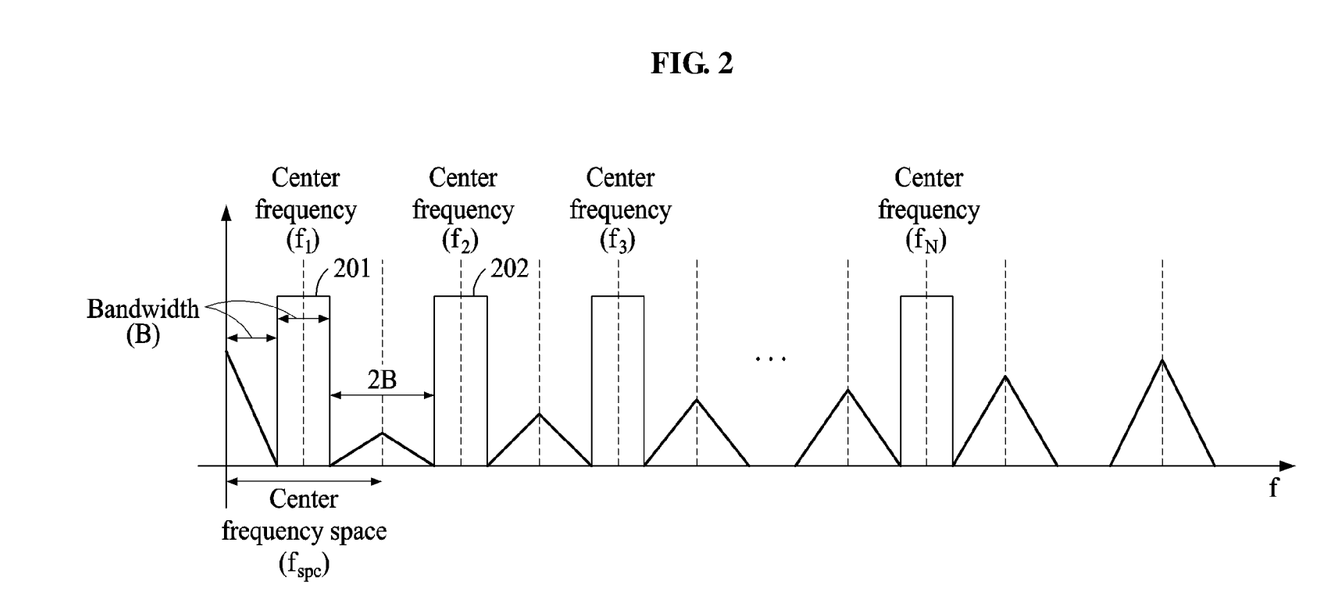
FIG. 2 is a graph illustrating an example of frequency allocation to avoid a secondary non-linear distortion component to be generated during a process of transmitting an optical signal according to an example embodiment.

FIG. 2 is a graph illustrating an example of frequency allocation to avoid a secondary non-linear distortion component to be generated during a process of transmitting an optical signal according to an example embodiment.

The graph of FIG. 2 illustrates an example of center frequencies allocated to IF carriers to avoid a secondary non-linear signal distortion component to be generated when a transmission apparatus converts signals. The graph of FIG. 2 also illustrates a result of allocating a center frequency set according to the following frequency plan.

For example, a center frequency $f_1$ and a center frequency $f_2$ may be allocated to an IF carrier #1 201 and an IF carrier #2 202, respectively. A bandwidth of each IF carrier may be B, and all frequency components in a band may have the same size. Further, a center frequency space between the IF carriers may be $f_{spc}$.

The transmission apparatus may assume a case in which N IF carriers are disposed at the same frequency interval, as shown in the graph of FIG. 2. Here, $f_1$ may be a center frequency of an IF carrier having a lowest center frequency among the IF carriers. In a case in which the frequency space $f_{spc}$ between the IF carriers is three times the bandwidth B of each of the IF carriers and $f_1$ is an even-number multiple of a half of $f_{spc}$, a distortion component having a bandwidth of 2 B may be generated at the center frequency of each of the IF carriers. Further, in a case in which the frequency space $f_{spc}$ between the IF carriers is three times the bandwidth B of each of the IF carriers and $f_1$ is an odd-number multiple of a half of $f_{spc}$, distortion components having a bandwidth of 2 B may be generated alternately at the center frequency of the IF carrier #1 201 and the center frequency of the IF carrier #2 202.

Thus, the transmission apparatus may determine the frequency space $f_{spc}$ between the IF carriers to be three times the bandwidth B, and the lowest center frequency $f_1$ to be an odd-number multiple of a half of $f_{spc}$, thereby preventing interference between the modulation signals and the distortion component while using frequencies most efficiently. However, this frequency plane may increase a required bandwidth at least three times.

Figure 3:
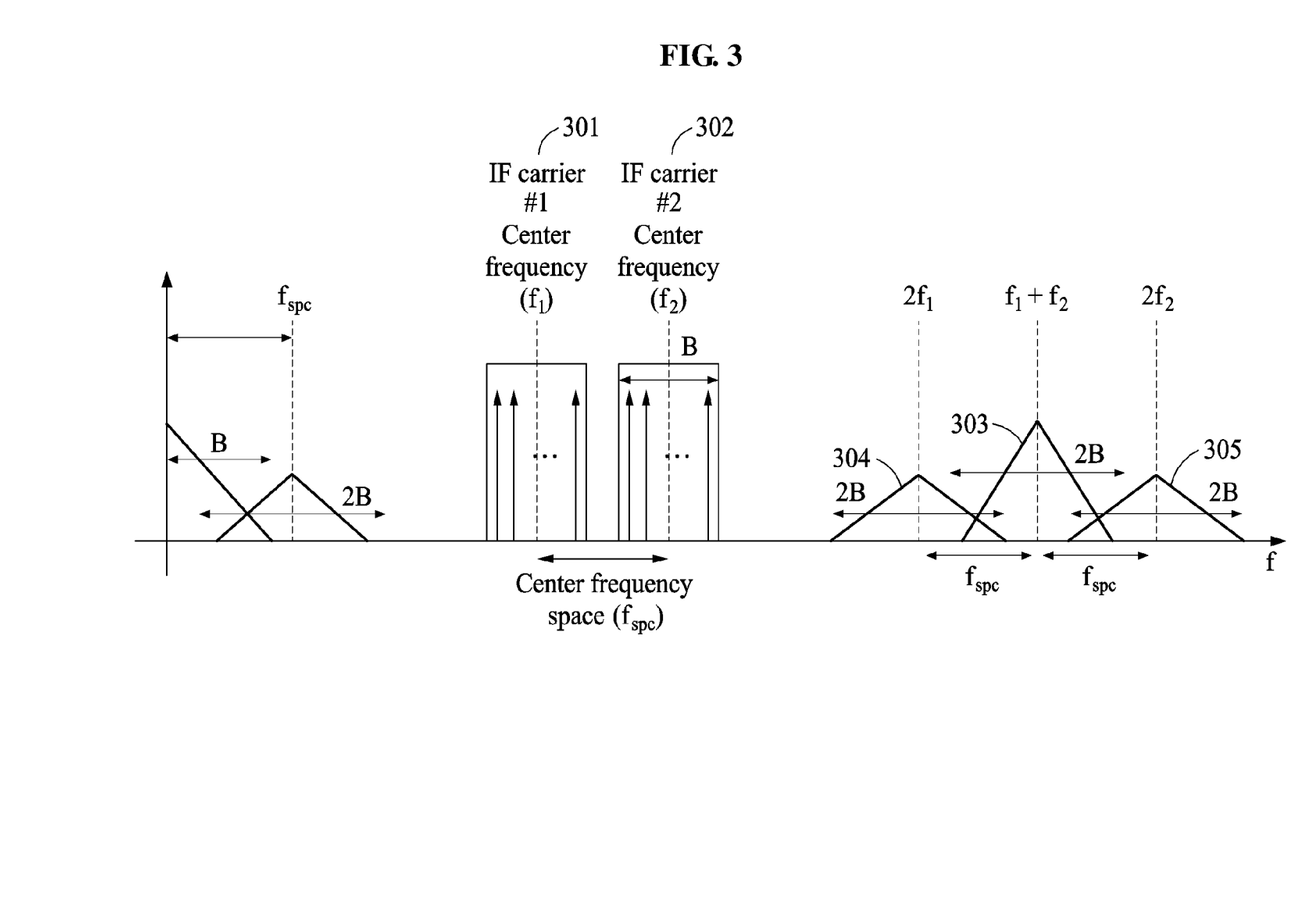
FIG. 3 is a graph illustrating a secondary non-linear signal distortion phenomenon by a chirp and a chromatic dispersion of a laser according to an example embodiment.

FIG. 3 is a graph illustrating a secondary non-linear signal distortion phenomenon by a chirp and a chromatic dispersion of a laser according to an example embodiment.

The graph of FIG. 3 summarizes the secondary non-linear signal distortion phenomenon by the chirp and the chromatic dispersion of the laser.

For example, a center frequency $f_1$ and a center frequency $f_2$ may be allocated to an IF carrier #1 301 and an IF carrier #2 302, respectively. A bandwidth of each IF carrier may be B, and all frequency components in a band may have the same size. Further, a center frequency space between the IF carriers may be $f_{spc}$.

Referring to FIG. 3, a secondary distortion component may appear based on a sum and difference component of center frequencies, that is, a secondary harmonic component. For example, as shown in FIG. 2, a secondary distortion component 303 having a bandwidth of 2 B may be generated at a frequency $f_1+f_2$ corresponding to a sum of the center frequencies. Further, a secondary distortion component between frequency components existing in the bandwidth B may also be generated. Thus, as shown in FIG. 2, a distortion component 304, 305 having a bandwidth of 2 B may be generated at a center frequency of each distortion component. An amplitude of the distortion component may increase in proportion to a length of an optical fiber.

In this example, an interaction between the chirp and the chromatic dispersion of the laser in an optical link corresponding to a mobile fronthaul section used herein may cause a phase shaft of a signal to be transmitted, that is, an IF carrier. Further, the phase-shifted IF carrier may be converted from an optical signal to an electrical signal through a reception apparatus, and the secondary non-linear distortion form of FIG. 2 may appear. A frequency band of the generated second non-linear signal distortion component may be predicted as expressed by Equation 1.

$$2f_1+(k-1)\cdot f_{spc}-B < f_{distortion} < 2f_1+(k-1)\cdot f_{spc}+B, \text{ (where } k=1,2,\ldots,2n-1),$$ [Equation 1]

Based on Equation 1, it may be predicted that a secondary non-linear signal distortion component $f_{distortion}$ by a chirp and a chromatic dispersion may be generated in a frequency band greater than a frequency satisfying a condition $2f_1+(k-1)\cdot f_{spc}-B$ and less than a frequency satisfying a condition $2f_1+(k-1)\cdot f_{spc}+B$.

Thus, the present disclosure may allocate a frequency of an IF carrier in view of a frequency band of an expectable secondary non-linear signal distortion component as described above, thereby avoiding the non-linear signal distortion component to be generated by an interaction between a chirp and a chromatic dispersion of a laser. A configuration therefor will be described in detail with reference to FIG. 4.

Figure 4:
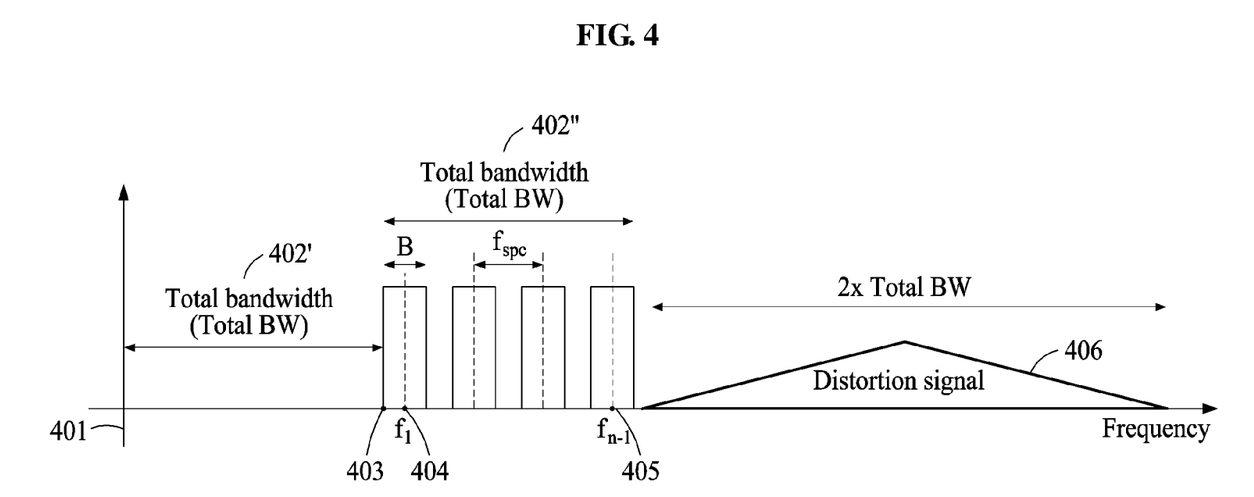
FIG. 4 is a graph illustrating a frequency allocation condition to avoid a secondary non-linear distortion phenomenon according to an example embodiment.

FIG. 4 is a graph illustrating a frequency allocation condition to avoid a secondary non-linear distortion phenomenon according to an example embodiment.

Referring to FIG. 4, a transmission apparatus may allocate a center frequency of an IF carrier to avoid a non-linear signal distortion component to be generated by an interaction between a chirp and a chromatic dispersion of a laser.

In detail, the secondary non-linear signal distortion component by the chirp and the chromatic dispersion may appear in a frequency band as expressed by Equation 1. A start frequency of the secondary non-linear signal distortion component may be $2f_1-B$. Further, if a total bandwidth of combined IF carriers is Total BW=$(n-1)\cdot f_{spc}+B$, an outermost frequency component of a signal to be transmitted may be calculated based on $f_1+(n-1)\cdot f_{spc}+0.5B$. Here, the total bandwidth of the combined IF carriers may be determined based on a bandwidth of each of the combined IF carriers, a center frequency space between the IF carriers, and a number of the IF carriers.

For an IF carrier to avoid a secondary non-linearity, the outermost frequency component, that is, a center frequency of a last IF carrier of the combined IF carriers, may satisfy a condition as expressed by Equation 2.

$$f_1+(n-1)\cdot f_{spc}+0.5\ B < 2f_1-B$$ [Equation 2]

When summarizing Equation 2, a center frequency 405 of the last IF carrier may obtain $(n-1)\cdot f_{spc}+1.5\ B < f_1$ as a condition to avoid the secondary non-linearity. A center frequency 404 of a first IF carrier of the IF carriers combined based on the condition may be set based on a condition as expressed by Equation 3.

$$\text{Total BW}+0.5\ B < f_1$$ [Equation 3]

Thus, the present disclosure may allocate a center frequency of the combined IF carriers at a position which is spaced apart at least by a predetermined interval 402' corresponding to a total bandwidth 402" of the combined IF carriers based on a position 401 of a direct current (DC). Here, as shown in FIG. 4, the predetermined interval 402' may be equal to the total bandwidth 402" of the IF carriers.

In this example, the center frequency 404 of the first IF carrier 403 may be determined based on the total bandwidths 402" of the combined IF carriers and a half of a bandwidth of the first IF carrier 403.

The present disclosure may allocate the center frequency 405 of the last IF carrier of the combined IF carriers such that the center frequency 405 of the last IF carrier may satisfy the center frequency 404 of the first IF carrier and a half of a bandwidth of the last IF carrier based on the total bandwidth 402" of the combined IF carriers, thereby avoiding a secondary non-linear signal distortion component to be generated in response to signal conversion.

Further, as shown in FIG. 4, the IF carriers may be converted from electrical signals to optical signals at a position which is spaced apart by a predetermined interval and sequentially transmitted to a reception apparatus. In response to completion of the transmission of the combined IF carriers including the last IF carrier to the reception apparatus, the secondary non-linear signal distortion component 406 corresponding to twice the total bandwidth 402" of the combined IF carriers may be generated.

Figure 5:
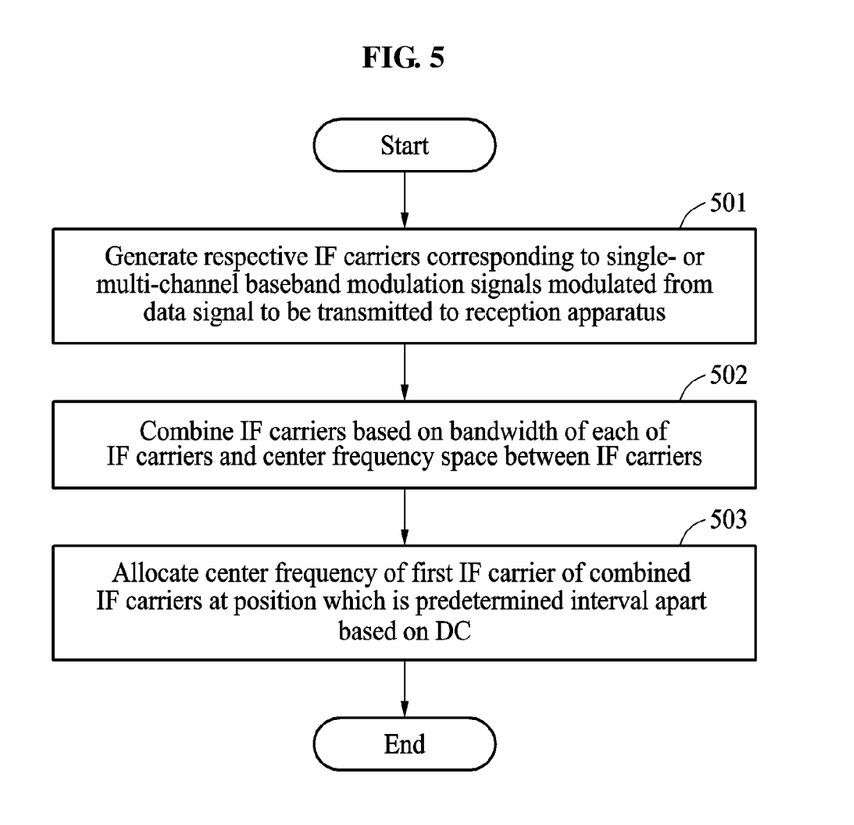
FIG. 5 is a flowchart illustrating a frequency allocation method according to an example embodiment.

FIG. 5 is a flowchart illustrating a frequency allocation method according to an example embodiment.

Referring to FIG. 5, in operation 501, a transmission apparatus may modulate a data signal to be transmitted to a reception apparatus into single- or multi-channel baseband modulation signals. The transmission apparatus may generate respective IF carriers corresponding to the modulation signals.

In operation 502, the transmission apparatus may combine the IF carriers based on a bandwidth of each of the IF carriers and a center frequency space between the IF carriers.

In operation 503, the transmission apparatus may allocate a center frequency of a first IF carrier of the combined IF carriers at a position which is a predetermined interval apart based on DC. That is, the transmission apparatus may allocate the center frequency of the first IF carrier at a position which is a predetermined interval corresponding to a total bandwidth of the combined carriers apart. Here, the total bandwidth of the combined IF carriers may be determined based on the bandwidth of each of the combined IF carriers, the center frequency space between the IF carriers, and a number of the IF carriers.

Further, the center frequency of the first IF carriers may be determined based on the total bandwidth of the combined IF carriers and a half of a bandwidth of the first IF carrier. The transmission apparatus may allocate a center frequency of a last IF carrier of the combined IF carriers such that the center frequency of the last IF carrier may satisfy the center frequency of the first IF carrier and a half of the bandwidth of the last IF carrier based on the total bandwidth of the combined IF carriers, thereby avoiding a second non-linear signal distortion component to be generated in response to signal conversion.

A secondary non-linear signal distortion component corresponding to twice the total bandwidth of the combined IF carriers may be generated.

According to example embodiments, a frequency allocation method performed by a transmission apparatus may prevent a performance degradation by an interaction for system transmission using an IF frequency plan to avoid a non-linear signal distortion component that is generated by an interaction between a chirp and a chromatic dispersion of a laser in a mobile fronthaul using an IFoF based analog transmission scheme.

The components described in the example embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the example embodiments of the present invention may be achieved by software, and the software may be recorded on a recording medium. The components, the functions, and the processes described in the example embodiments of the present invention may be achieved by a combination of hardware and software.

The units described herein may be implemented using hardware components and software components. For example, the hardware components may include microphones, amplifiers, band-pass filters, audio to digital converters, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A frequency allocation method performed by a transmission apparatus, the frequency allocation method comprising:
    modulating a data signal to be transmitted to a reception apparatus into single or multi-channel baseband modulation signals;
    generating respective intermediate frequency (IF) carriers corresponding to the modulation signals;
    combining the IF carriers based on a bandwidth of each of the IF carriers and a center frequency spacing between the IF carriers; and
    transmitting the combined IF carriers by assigning a center frequency of a first IF carrier of the combined IF carriers based on a total bandwidth of the combined IF carriers and a half of a bandwidth of the first IF carrier.

2. The frequency allocation method of claim 1, wherein the total bandwidth of the combined IF carriers is determined based on the bandwidth of each of the combined IF carriers, the center frequency spacing between the IF carriers, and a number of the IF carriers.

3. The frequency allocation method of claim 1, wherein the assigning comprises allocating a center frequency of a last IF carrier of the combined IF carriers in such a manner that the center frequency of the last IF carrier is allocated based on the center frequency of the first IF carrier, a half of a bandwidth of the last IF carrier, and a total bandwidth of the combined IF carriers.

4. The frequency allocation method of claim 1, wherein the combined IF carriers are converted from electrical signals to optical signals and sequentially transmitted to the reception apparatus.

5. A transmission apparatus, comprising:
    a signal modulator configured to modulate a data signal to be transmitted to a reception apparatus into single or multi-channel baseband modulation signals;
    a signal converter configured to convert combinations of the modulation signals and corresponding carrier signals into intermediate frequency (IF) carriers;
    a signal combiner configured to combine the IF carriers; and
    a signal transmitter configured to transmit the combined IF carriers using optical signals by assigning a center frequency of a first IF carrier of the combined IF carriers based on a total bandwidth of the combined IF carriers and a half of a bandwidth of the first IF carrier.

6. The transmission apparatus of claim 5, wherein the total bandwidth of the combined IF carriers is determined based on a bandwidth of each of the combined IF carriers, a center frequency spacing between the IF carriers, and a number of the IF carriers.

7. The transmission apparatus of claim 5, wherein the signal transmitter is configured to allocate a center frequency of a last IF carrier of the combined IF carriers in such a manner that the center frequency of the last IF carrier is allocated based on the center frequency of the first IF carrier, a half of a bandwidth of the last IF carrier, and the total bandwidth of the combined IF carriers.

8. The transmission apparatus of claim 5, wherein the signal transmitter is configured to convert the combined IF carriers from electrical signals to the optical signals and sequentially transmit the combined IF carriers to the reception apparatus.

* * * * *